US008602404B2

United States Patent
Li et al.

(10) Patent No.: US 8,602,404 B2
(45) Date of Patent: Dec. 10, 2013

(54) SUPPORT DEVICE

(75) Inventors: Hong-Zheng Li, Shenzhen (CN); Al-Jia Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 725 days.

(21) Appl. No.: 12/848,235

(22) Filed: Aug. 2, 2010

(65) Prior Publication Data

US 2011/0272875 A1  Nov. 10, 2011

(30) Foreign Application Priority Data

May 10, 2010  (CN) .......................... 2010 1 0167463

(51) Int. Cl.
*B23Q 3/18* (2006.01)
(52) U.S. Cl.
USPC .......................................... 269/303; 269/266
(58) Field of Classification Search
USPC .......... 269/303, 309–310, 291, 48.1, 254 CS; 248/678, 637, 560, 346.04
See application file for complete search history.

(56) References Cited

U.S. PATENT DOCUMENTS

| 5,887,862 | A | 3/1999 | Yonezawa |
| 7,290,761 | B2 * | 11/2007 | Siegel ........................... 269/266 |
| 8,267,390 | B2 * | 9/2012 | Dellach ........................ 269/266 |
| 2005/0269757 | A1 * | 12/2005 | Stevenson et al. ............ 269/266 |

FOREIGN PATENT DOCUMENTS

| CN | 2514967 Y | 10/2002 |
| CN | 101228005 A | 7/2008 |

* cited by examiner

*Primary Examiner* — Monica Carter
*Assistant Examiner* — Melanie Alexander
(74) *Attorney, Agent, or Firm* — Altis & Wispro Law Group, Inc.

(57) ABSTRACT

A support device includes a supporting portion touching and resisting on workpieces, a holding portion and a driving portion. The supporting portion elastically connects with the holding portion to adjust a relative position with the holding portion according to size of the workpieces. The supporting portion includes a supporting part and a first spring. The holding portion is driven by the driving portion to fasten the supporting portion to the holding portion when the relative position is determined. The holding portion includes a driving plate, a lid portion, a plurality of fixing blocks, a plurality of second springs, a first cover and a connecting part. The driving portion is used to drive the holding portion to engage with the supporting portion by the means of air pressure or hydraulic pressure, and includes a driving portion, a piston and a motherboard.

13 Claims, 4 Drawing Sheets

SUPPORT DEVICE

BACKGROUND

1. Technical Field

The present disclosure relates to a support device.

2. Description of Related Art

In manufacturing, many products have a variety of shapes. Components of a product need to physically support one another during assembling of the products. Physical support positions (hereinafter, "supporting spot"), where one component supports and meets another component need to be controlled. Generally, these supporting spots are controlled by manual operation with a screw. However, there are many disadvantages for manual operation including:

1. Increasing power of work because every supporting spot needs to be controlled by manual operation.

2. Precision of the supporting spot is difficult to control and the quality of products is also difficult to ensure because they are completely depended on user experience.

Thus, automation of operation is very difficult to achieve.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
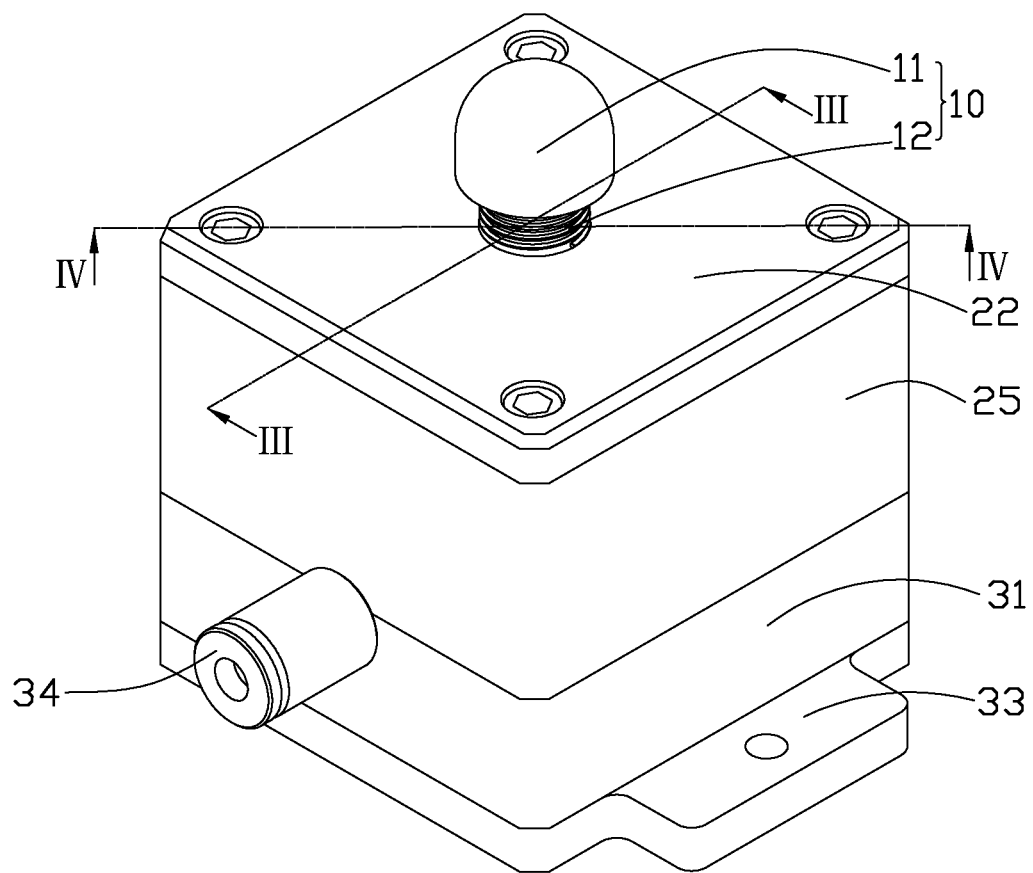
FIG. 1 is an isometric view of one embodiment of a support device in accordance with the present disclosure.
Figure 2:
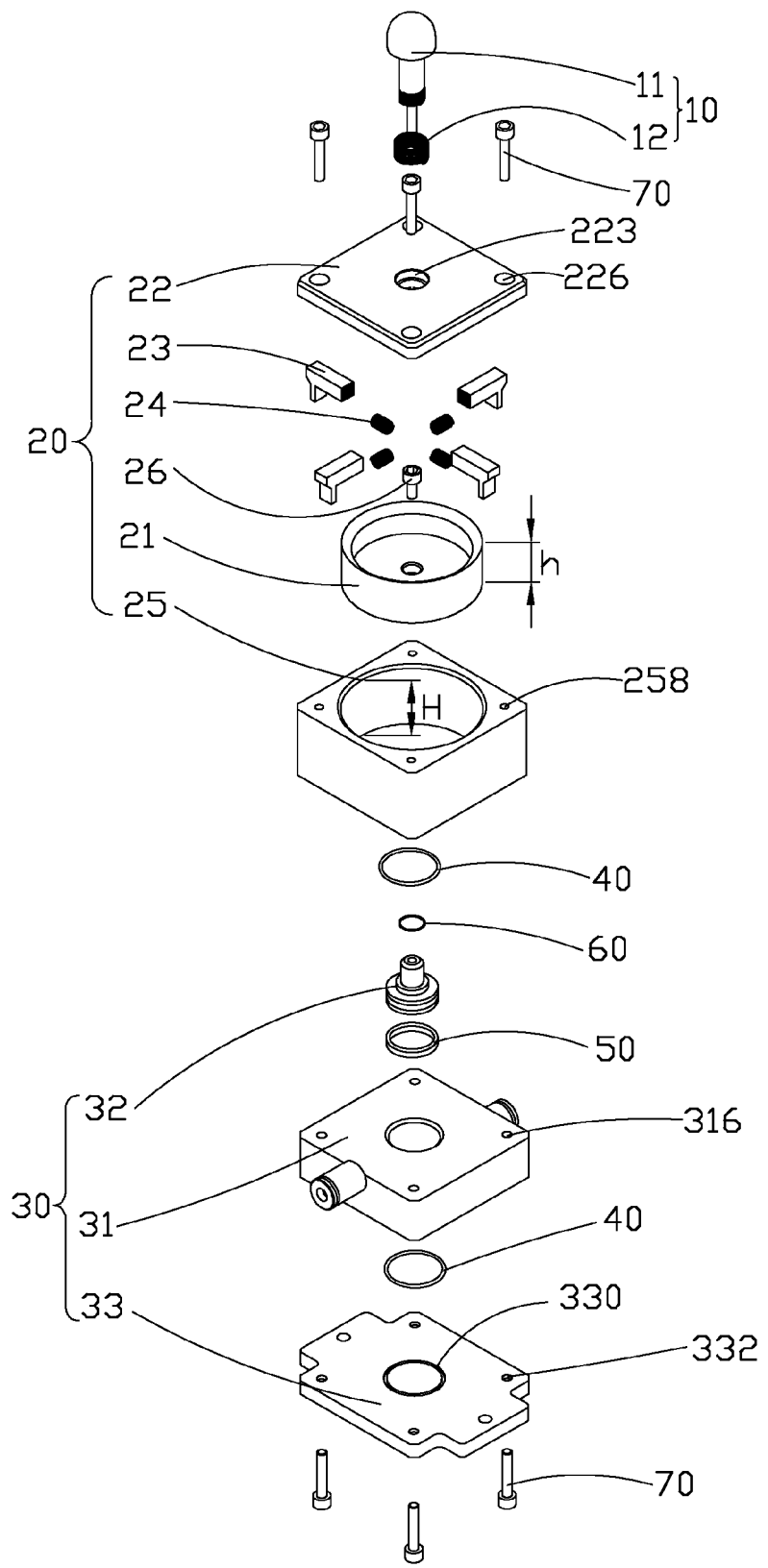
FIG. 2 is a disassembled perspective view of the embodiment of the support device in accordance with the present disclosure.

FIG. 1 is an isometric view of a support device and FIG. 2 is a disassembled perspective view of the support device in accordance with the present disclosure. The support device comprises a supporting portion 10 used to support workpieces 100 (shown in FIG. 3), a holding portion 20, and a driving portion 30. The supporting portion 10 elastically connects with the holding portion 20, and a relative position between the supporting portion 10 and the holding portion 20 can be adjusted according to sizes of the workpieces 100. The supporting portion 10 comprises a supporting part 11 and a second spring 12. The holding portion 20 is used to fasten the supporting portion 10 to the holding portion 20 when the relative position is determined, and comprises a driving plate 21, a lid portion 22, a plurality of fixing blocks 23, a plurality of first springs 24, a first cover 25 and a connecting part 26.

The driving portion 30 is used to drive the holding portion 20 to engage with the supporting portion 10 by the means of air pressure or hydraulic pressure, and comprises a driving part 31, a piston 32 and a motherboard 33.

Figure 3:
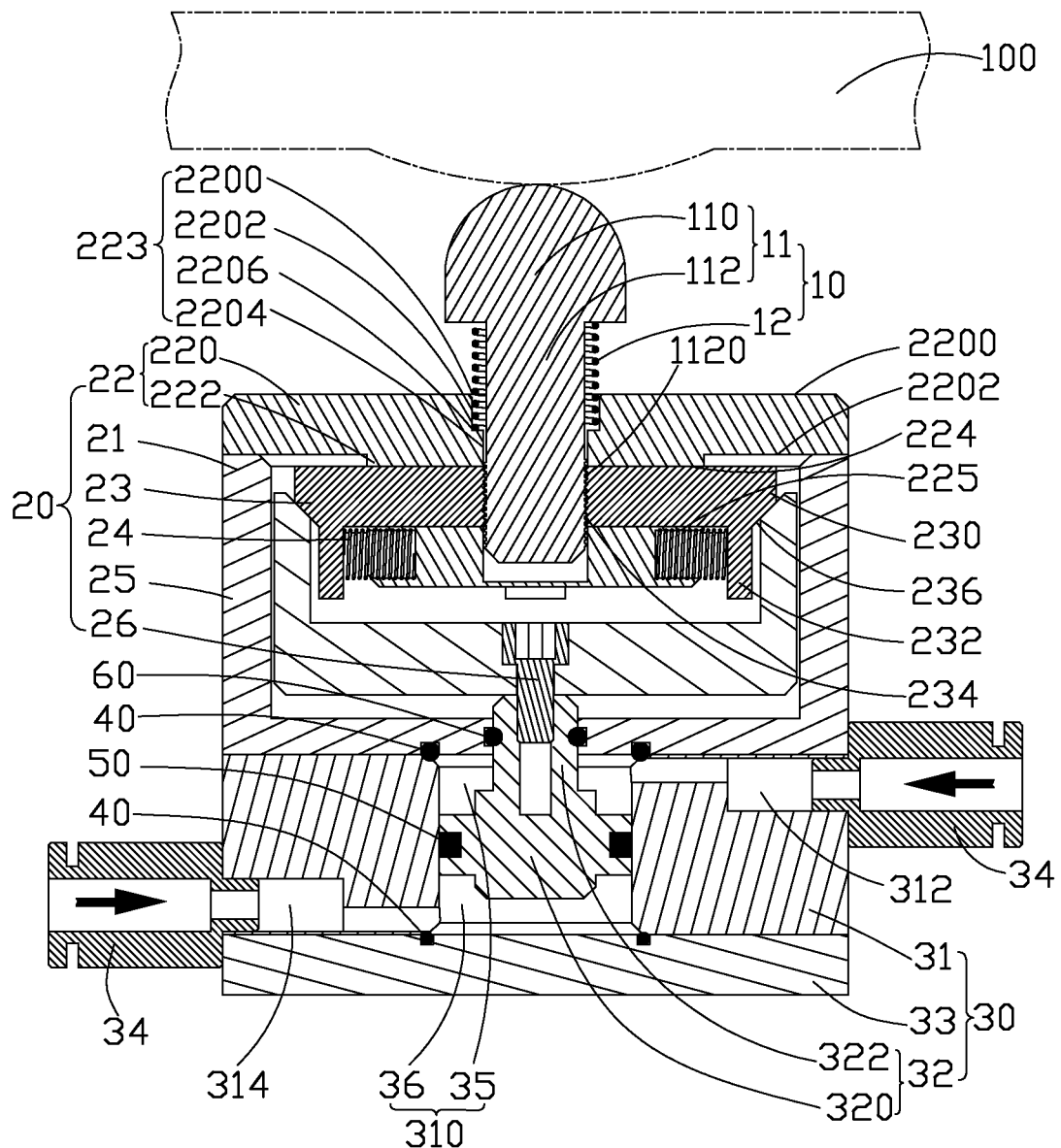
FIG. 3 is a cross-sectional view taken along line III-III of FIG. 1.
Figure 4:
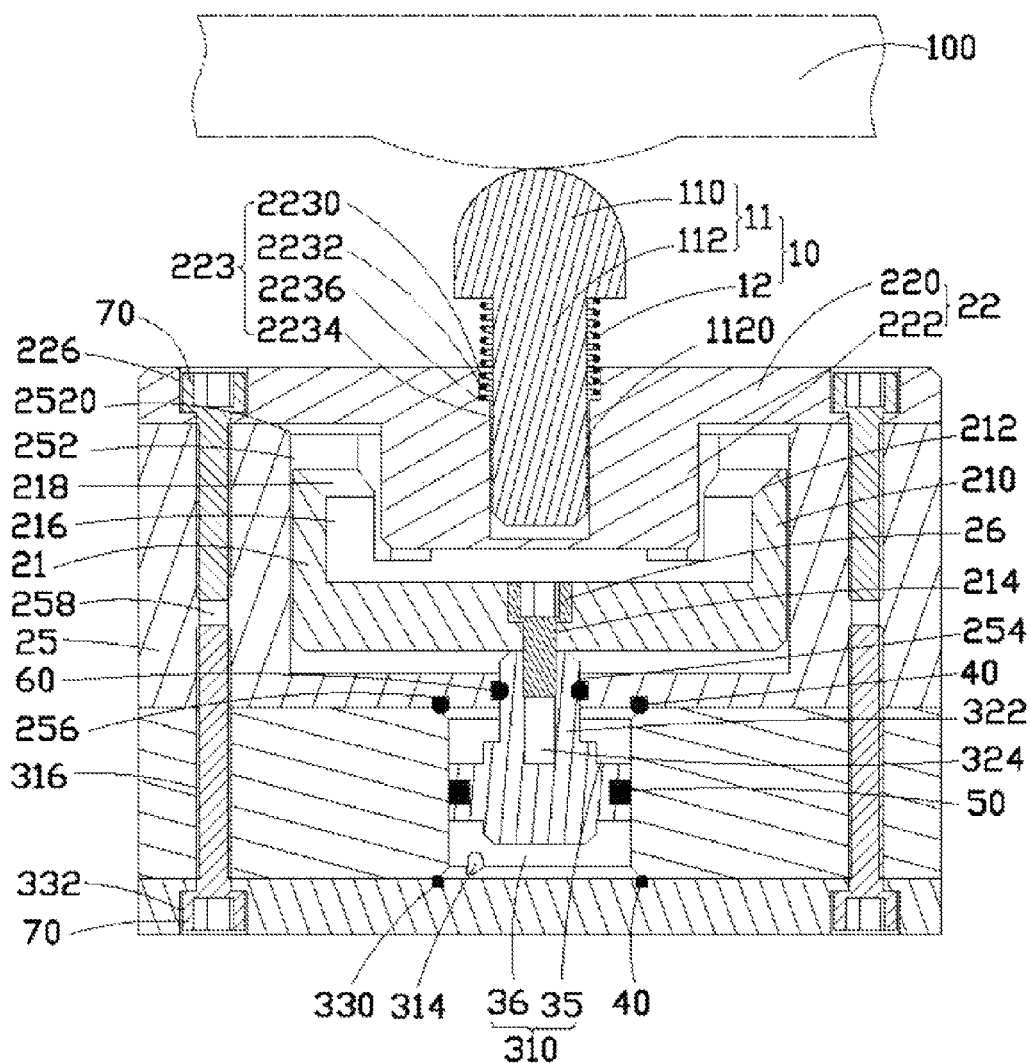
FIG. 4 is a cross-sectional view taken along line IV-IV of FIG. 1.

FIG. 3 is a cross-sectional view taken along line III-III of FIG. 1, and FIG. 4 is a cross-sectional view taken along line IV-IV of FIG. 1. The supporting part 11 comprises a head portion 110 and a rod portion 112. The head portion 110 touches and resists on the workpiece 100. The second spring 12 is coiled around the rod portion 112 and is urged between the head portion 110 and the holding portion 20. The supporting part 11 moves along an axial direction of the rod portion 112 with the function of the second spring 12 so that it can support workpieces 100 with different shapes.

In the illustrated embodiment, the supporting part 11 is a bolt, and the head portion 110 is circular or rectangular-shaped. The head portion 110 can be changed into different shapes according to the shape of the workpiece 100.

In another embodiment, whenever a protrusion is protruded outwardly from the rod portion 112 or securely mounted on the rod portion 112, the second spring 12 can resist on it. For example, the part may be a plurality of protrusions which are evenly spaced apart from each other and protruded outwardly from the rod portion 112 to engage with the second spring 12. The part also may be a convex stage protruded outwardly from the rod portion 112 to engage with the second spring 12.

As shown in FIG. 3 and FIG. 4, the lid portion 22 is engaged with the supporting portion 10 and comprises a main body 220 and a retaining protrusion 222. The main body 220 comprises an upper surface 2200 and a lower surface 2202 opposite to the upper surface 2200. The retaining protrusion 222 protrudes from the lower surface 2202 and is integrally formed with the main body 220. The main body 220 defines a first receiving hole 223 coaxially extending towards the driving plate 21. The first receiving hole 223 comprises a second open end 2230 on the upper surface 2200. The rod portion 112 of the supporting part 11 is inserted through the second open end 2230 and moves into the first receiving hole 223 to fix the supporting portion 10 onto the holding portion 20. The first receiving hole 223 comprises a receiving segment 2232 and a guide segment 2234. The receiving segment 2232 is located between the second open end 2230 and the guide segment 2234. In the illustrated embodiment, the first receiving hole 223 is a stepped hole. The diameter of the receiving segment 2232 is larger than that of the guide segment 2234 to form a stepped portion 2236 between the receiving segment 2232 and the guide segment 2234. The other end of the second spring 12 is received in the receiving segment 2232 and resisted between the stepped portion 2236 and the head portion 110 to elastically fix the supporting portion 10 on the lid portion 22.

In the illustrated embodiment, the retaining protrusion 222 is cylindrically-shaped. The retaining protrusion 222 defines a plurality of through holes 224 used to receive the plurality of fixing blocks 23 and a plurality of positioning grooves 225 used to receive the plurality of first springs 24. The plurality of through holes 224 are spaced apart from each other and perpendicularly communicate with the first receiving hole 223. Each of the plurality of positioning grooves 225 is twinned with a corresponding through hole 224 and disposed between the corresponding through hole 224 and the driving plate 21. In the illustrated embodiment, a section of through hole 224 is rectangular-shaped and that of the positioning groove 225 is round-shaped. Each of the plurality of fixing blocks 23 comprises a clamping portion 230. The clamping portion 230 is received in the corresponding through hole 224 and comprises a clamping surface 234. In the illustrated embodiment, the clamping surface 234 has a rough surface, and the rough surface may have zigzag, serrate or saw-toothed surfaces. The rod portion 112 comprises a securing segment 1120. In the illustrated embodiment, a surface of the securing segment 1120 is treated with a rough surface. The clamping surface 234 engages with the securing segment 1120 to securely fasten the supporting part 11 on the holding portion 20.

The driving plate 21 can move back and forth alternately in the housing space formed by the lid portion 22 and the first cover 25 together. The driving plate 21 comprises a sleeve-shaped wall 210 and a hollow cavity 216 surrounded by the sleeve-shaped wall 210. The retaining protrusion 222 of the lid portion 22 inserted into the hollow cavity 216 is separated from the sleeve-shaped wall 210 so as to allow ease of installing the plurality of fixing blocks 23 and the plurality of first springs 24. Each of the plurality of fixing blocks 23 further comprises an extending arm 232 perpendicularly extending from the clamping portion 230 towards the hollow cavity 216 to dispose the corresponding fixing blocks 23 between the first receiving hole 223 and the sleeve-shaped wall 210. The plurality of first springs 24 are twinned with the plurality of fixing blocks 23. One end of the each plurality of first springs 24 is received in the corresponding positioning groove 225 and the other end is resisted between the corresponding extending arm 232 and the retaining protrusion 222 of the lid portion 22.

Each of the plurality of fixing blocks 23 moves along the corresponding through hole 224 between the rod portion 112 of the supporting part 11 and the sleeve-shaped wall 210 of the driving plate 21 when driven by the corresponding first spring 24. The sleeve-shaped wall 210 comprises a first inclined plane 212 inclining towards an inside of the sleeve-shaped wall 210. However, the clamping portion 230 comprises a second inclined plane 236 angled with the extending arm 232. The first inclined plane 212 is opposite to the second inclined plane 236 and engages with the second inclined plane 236 to make the driving plate 21 drive the fixing block 23 to move back and forth alternately.

As shown in the FIG. 2 and FIG. 4, the first cover 25 is disposed between the lid portion 22 and the driving portion 30 and comprises a centrosymmetric receiving house 252. In the illustrated embodiment, the housing space formed by the lid portion 22 and the first cover 25 together is the receiving house 252. An inner height H of the receiving house 252 is larger than an outer height h of the driving plate 21 so that the driving plate 21 is movably received in the receiving house 252. The receiving house 252 comprises a house opening 2520 contiguous with the lower surface 2202 of the lid portion 22. The housing opening 2520 is shielded by the main body 220 of the lid portion 22. In the illustrated embodiment, the first cover 25 is rectangular-shaped and defines a plurality of first connecting holes 258. The plurality of first connecting holes 258 are located on four corners of the first cover 25 and run through a surrounding wall of the receiving house 252. The main body 220 of the lid portion 22 is rectangular-shaped and defines a plurality of first counter bores 226. Each of the plurality of first counter bores 226 coaxially communicates with the corresponding first connecting hole 258 and is located on a corresponding corner of the main body 220. A plurality of bolts 70 run through the plurality of first counter bores 226 and are locked in the plurality of first connecting holes 258 to securely mount the lid portion 22 onto the first cover 25. In the illustrated embodiment, the first cover 25 acts as a middle part to securely mount the lid portion 22 on the driving portion 30. In other embodiments, the lid portion 22 can be securely mounted on the driving portion 30 by setting a plurality of fixing rods on the lid portion 22.

The driving part 31 is securely mounted between the holding portion 20 and the motherboard 33. In the illustrated embodiment, the driving part 31 is hexahedrally-shaped. The driving part 31 defines a plurality of second connecting holes 316 which are through holes and coaxially communicate with the corresponding first connecting holes 258. The motherboard 33 defines a plurality of second counter bores 332. The plurality of second counter bores 332 are located on four corners of the motherboard 33 and coaxially communicate with the plurality of second connecting hole 316. The plurality of bolts 70 run through the plurality of second counter bores 332 and are locked in the plurality of second connecting holes 316 and the plurality of first connecting holes 258 to securely mount the motherboard 33 onto the driving part 31 and to securely mount the driving portion 30 on the holding portion 20. In the illustrated embodiment, heads of the plurality of bolts 70 are received in the plurality of counter bores 332 to keep an even surface for the motherboard 33.

An air cylinder 310 in the center of the driving part 31 is defined. In the illustrated embodiment, the air cylinder 310 is columnarly-shaped with a hollow center. The first cover 25 defines a first receiving groove 256 disposed around the air cylinder 310 and towards the air cylinder 310. The first receiving groove 256 is used to receive a first joint washer 40. In the illustrated embodiment, a cross section of the first joint washer 40 is round-shaped. The first cover 25 is hermetically mounted onto the driving part 31 by using the first joint washer 40. A second receiving groove 330 is defined at the center of the motherboard 33 and used to receive the first joint washer 40. The motherboard 33 is hermetically mounted on the driving part 31 by using the first joint washer 40 so that the air cylinder 310 is an airproof mechanism.

The piston 32 is received in the air cylinder 310 to connect the driving portion 30 with the holding portion 20 and comprises a piston head 320. The piston head 320 is completely received in the air cylinder 320 to separate the air cylinder 30 into an upper gas chamber 35 with an upper suction port 312 and a lower gas chamber 36 with a lower suction port 314. The piston head 320 is hermetically mounted in the air cylinder 310 by a second joint washer 50 so that the upper gas chamber 35 is completely separated from the lower gas chamber 36. In the illustrated embodiment, a cross-section of the second joint washer 50 is rectangularly-shaped. The upper suction port 312 and the lower suction port 314 are securely fixed with two gas-type fittings 34 respectively. An air charging device (not shown) inflates air through the gas-type fitting 34 along the arrowhead shown in the FIG. 3 to drive the piston 32. In the illustrated embodiment, the driving portion 30 drives the holding portion 20 by the means of air pressure. In other embodiment, the driving portion 30 can drive the holding portion 20 by the means of hydraulic pressure.

The piston 32 further comprises a connecting pole 322 extending out from the air cylinder 310. The connecting pole 322 runs through the upper gas chamber 35 and extends into the first cover 25 to urge the driving plate 21. The first cover 25 defines a second securing hole 254 on a bottom of the receiving house 252. The second securing hole 254 coaxially communicates with the receiving house 252. The connecting pole 322 passes through the second securing hole 254 to hermetically connect the piston 32 with the first cover 25 by a third joint washer 60 which is received in a center of the second securing hole 254. The driving plate 21 defines a first securing hole 214 on a bottom of the driving plate 21. The first securing hole 214 coaxially communicates with the hollow cavity 216 and the second securing hole 254. In the illustrated embodiment, the first securing hole 214 is a counter bore. The connecting pole 322 defines a second receiving hole 324. The second receiving hole 324 extends along an axial line of the connecting pole 322 and is coaxial to the first securing hole 214. The connecting part 26 passes through the first securing hole 214 and is locked in the second securing hole 324 to securely mount the piston 32 onto the driving plate 21. Therefore, the holding portion 20 can be driven by the driving portion 30 through the connecting pole 322. In the illustrated embodiment, the connecting part 26 is a socket head screw. The connecting part 26 is completely received in the first securing hole 214 to prevent connecting part 26 from touching the lid portion 22.

As shown in FIG. 3, when the workpiece 100 is supported on the head portion 110 of the supporting part 11 in a self-locking process, air charged into the lower gas chamber 36 drives the piston head 320 to move away from the motherboard 33. In the illustrated embodiment, the air is charged by the air charging device (not shown) and runs through the gas-type fitting 34 to the lower suction port 314. The connecting pole 322 urges the driving plate 21 to move towards the lid portion 22 through the connecting part 26, and the first second spring 11 is compressed. Then, the first inclined plane 212 engages with second inclined plane 236 to impulse each of the plurality of fixing blocks 23 to move towards the rod portion 112 so that the plurality of fixing blocks 23 are securely fixed with the supporting part 11.

When the support device automatically looks for the workpiece 100, air charged into the upper gas chamber 35 drives the piston head 320 to move towards the motherboard 33. In the illustrated embodiment, the air is charged by the air charging device (not shown) and runs through the gas-type fitting 34 to the upper suction port 312. The connecting pole 322 urges the driving plate 21 to move away from the lid portion 22 through the connecting part 26, and the second spring 12 is loosened. Then, the first inclined plane 212 is separated from the second inclined plane 236, and each of the plurality of fixing blocks 23 moves away from the rod portion 112 under the driving of the plurality of first springs 24. The supporting part 11 moves towards the workpiece 100 under the driving of the second spring 12 until the supporting part 11 touches and resists the workpiece 100.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A support device, comprising:
a supporting portion, touching and resisting on workpieces;
a holding portion comprising a driving plate, a lid portion, a plurality of fixing blocks and a plurality of first springs, the driving plate comprising a sleeve-shaped wall and a hollow cavity surrounded by the sleeve-shaped wall, the lid portion inserted into the hollow cavity being separated from the sleeve-shaped wall to install the plurality of fixing blocks and the plurality of first springs; and
a driving portion;
wherein the supporting portion elastically connects with the holding portion to adjust a relative position with the holding portion according to size of the workpieces, the holding portion is driven by the driving portion to fasten the supporting portion to the holding portion when the relative position is determined.

2. The support device as claimed in claim 1, wherein the supporting portion comprises a supporting part and a second spring, the supporting part comprises a head portion and a rod portion, the head portion touches and resists on the workpiece, and the second spring is coiled around the rod portion and is urged between the head portion and the holding portion.

3. The support device as claimed in claim 2, wherein the rod portion comprises a securing segment treated with a rough surface.

4. The support device as claimed in claim 3, wherein the lid portion defines a first receiving hole coaxially extending to the driving plate, the first receiving hole comprises a second open end locating on a side of the lid portion away from the driving plate, and the rod portion is inserted through the second open end into the first receiving hole to fix the supporting portion onto the holding portion.

5. The support device as claimed in claim 4, wherein the first receiving hole further comprises a receiving segment and a guide segment, the diameter of the receiving hole is larger than that of the guide segment to form a stepped portion between the receiving segment and the guide segment, and the second spring is received in the first receiving hole and is resisted between the supporting portion and the stepped portion.

6. The support device as claimed in claim 5, wherein the lid portion further defines a plurality of through holes used to receive the plurality of fixing blocks and a plurality of positioning grooves used to receive the plurality of first springs, the plurality of through holes are evenly spaced apart from each other and perpendicularly communicate with the first receiving hole, and each of the plurality of positioning grooves is twinned with a corresponding through hole and disposed between the corresponding through hole and the driving plate.

7. The support device as claimed in claim 6, wherein each of the plurality of fixing blocks comprises a clamping portion, the clamping portion is received in the corresponding through hole and comprises a clamping surface, and the clamping surface engages with the securing segment to securely fasten the supporting part on the holding portion.

8. The support device as claimed in claim 7, wherein each of the plurality of fixing blocks further comprises an extending arm perpendicularly extending from the clamping portion towards the hollow cavity to dispose the corresponding fixing block between the first receiving hole and the sleeve-shaped wall.

9. The support device as claimed in claim 8, wherein each of the plurality of first springs is twinned with a corresponding fixing block and received in the corresponding positioning groove to be resisted between the extending arm and the lid portion.

10. The support device as claimed in claim 9, wherein the sleeve-shaped wall comprises a first inclined plane inclining towards an inside of the sleeve-shaped wall, the clamping portion comprises a second inclined plane opposite to the first inclined plane, and the first inclined plane engages with the second inclined plane to make the driving plate drive the fixing block to move back and forth alternately.

11. The support device as claimed in claim 10, wherein the holding portion further comprises a first cover disposed between the lid portion and the driving portion, the first cover comprises a receiving house, and an inner height of the receiving house is larger than an outer height of the driving plate so that the driving plate is movably received in the receiving house.

12. The support device as claimed in claim 11, wherein the driving portion comprises a driving part and a piston, an air cylinder in a center of the driving part is defined, the piston comprises a piston head and a connecting pole, the piston head is completely received in the air cylinder to separate the air cylinder into an upper gas chamber and a lower gas chamber, and the connecting pole runs through the upper gas chamber and extends into the first cover to urge the driving part.

13. The support device as claimed in claim 12, wherein the first cover defines a second securing hole coaxially communicating with the receiving house, the connecting pole passes through the second securing hole to hermetically connect the piston with the first cover, the driving plate defines a first securing hole coaxially communicating with the hollow cavity and the second securing hole, the connecting pole defines a second receiving hole coaxial to the first securing hole, and a connecting part passes through the first securing hole and is locked in the second receiving hole to securely mount the piston onto the driving plate.

\* \* \* \* \*